(12) United States Patent
Deynet

(10) Patent No.: US 6,208,048 B1
(45) Date of Patent: Mar. 27, 2001

(54) MOTOR-PUMP UNIT, PARTICULARLY MOTOR VEHICLE ANTI-LOCK BRAKE DEVICE HAVING INTERNAL ELECTRICAL CONNECTING LINES

(75) Inventor: Rolf Deynet, Würzburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/303,115

(22) Filed: Sep. 8, 1994

(30) Foreign Application Priority Data

Sep. 8, 1993 (EP) .................................. 93114443

(51) Int. Cl.$^7$ .............................. H02K 5/10; H02K 23/66
(52) U.S. Cl. ................... 310/71; 417/424.1; 417/423.14
(58) Field of Search .................. 310/71; 417/423.14, 417/424.1

(56) References Cited

U.S. PATENT DOCUMENTS

| 2,612,843 | * | 10/1952 | Gruetjen | 103/87 |
| 3,093,083 | * | 6/1963 | Nielsen | 103/25 |
| 4,619,591 | * | 10/1986 | Iwai et al. | 310/89 |
| 5,055,000 | * | 10/1991 | Akhter | 417/40 |
| 5,073,736 | * | 12/1991 | Gschwender et al. | 310/88 |
| 5,164,625 | * | 11/1992 | Hoffmann et al. | 310/88 |
| 5,196,752 | * | 3/1993 | Palma | 310/260 |
| 5,326,235 | * | 7/1994 | Bruhn | 310/89 |
| 5,360,322 | * | 11/1994 | Henein et al. | 417/313 |
| 5,362,137 | * | 11/1994 | Kohno . | |
| 5,528,093 | * | 6/1996 | Adam et al. | 310/89 |

FOREIGN PATENT DOCUMENTS

| 36 42 726 | 6/1988 | (DE) | H02K/17/30 |
| 0 413 849 | 2/1991 | (EP) | H02K/23/66 |
| 0 432 283 | 6/1991 | (EP) | H02K/5/22 |
| 60-152247 | 8/1985 | (JP) | H02K/9/06 |

* cited by examiner

*Primary Examiner*—Thomas M. Dougherty
(74) *Attorney, Agent, or Firm*—Kenyon & Kenyon

(57) ABSTRACT

A motor-pump unit of a motor vehicle anti-lock brack device may be simply sealed off from moisture with end-surface application of a motor housing (1), and/or an electronic housing (3), in front of and/or behind a pump housing (2). Connecting lines (6.1; 6.2) between a brush plate (1.2) in the motor housing (1) and a circuit board (3.1) in the electronic housing (3) are laid within the motor housing (1) and pump housing (2) through lead-throughs in the adjoining end surfaces rather than being laid on the outside over the pump housing (2). These surfaces rest against each other and are sealed-off from each other by circumferential packings (9; 9.1) arranged radially towards the outside.

21 Claims, 1 Drawing Sheet

MOTOR-PUMP UNIT, PARTICULARLY MOTOR VEHICLE ANTI-LOCK BRAKE DEVICE HAVING INTERNAL ELECTRICAL CONNECTING LINES

BACKGROUND OF THE INVENTION

The present invention refers to a motor-pump unit, and particularly to a motor vehicle anti-lock brake device including a motor housing, a pump housing, an electronic housing and electrical connecting lines.

European Patent Document No. A1 0 472 746 discloses a commutator motor having a deep-drawn pot-shaped housing onto the edge of the pot on the commutator side of which a cast bearing plate can be bolted. The cast bearing plate has a hollow cylindrical bearing neck which protrudes on its end and receives within it a rotor-shaft ball bearing and is developed on the outside for the placing-on of a flange opening of a hydraulic pump which is to be driven. In a bearing neck on the pot-bottom side, the rotor shaft is furthermore rotatably supported by a spherical cap bearing. A plastic cover cap is placed on the end of the pot bottom side of the motor housing which has a cable channel extending partially axially on the outside of the motor housing. An outer connecting line extends in a sealed off manner to the outside of the unit on the commutator side through an opening in the motor housing. This is connected to a customer's plug which is held in an insulated manner in the end of the pot-shaped plastic cover cap.

Furthermore, it has previously been proposed to arrange an electronic housing on the end surface of the pump housing facing away from the motor housing which receives an electric and/or electronic supply control device which is held or contacted in particular by a circuit board. The control device and circuit board are connected via electric supply and/or control lines to electric components in the motor housing, and in particular, to the brush plate arranged within the motor housing of a commutator motor. However, problems have previously occurred due to moisture penetrating the electrical supply and/or control lines and/or one or more of the housings.

SUMMARY OF THE INVENTION

In accordance with the present invention, a motor-pump unit is provided in particular for a motor vehicle anti-lock braking device, having electric connecting lines between the inside of the motor housing on the one side, and the inside of the electronic housing on the other side, for which, with simple means of manufacture and assembly, full protection against the penetration of moisture can be assured. This is achieved in accordance with the present invention as described below.

The connecting lines may be laid in accordance with the present invention between the motor housing and the electronic housing through the inside of the motor housing and the pump housing as well as the electronic housing. Additionally, the lead-throughs in the end surfaces, lying closely one in front of the other, of the housings are arranged axially one behind the other. This arrangement does not require complicated lead-outs, which are difficult to seal, of the connecting lines out of the outer wall, which is generally not flat, of the motor housing to outside the unit. It is therefore not necessary in the present invention for the laying of the connecting lines along the outer circumference of the unit and their reintroduction into the electric housing.

If a softer material is provided for one of the housings than for the other opposite housing, a seal between the two end surfaces which lie one in front of the other can be improved in a simple manner by forming on the end surface of the housing of the harder material a circumferential protruding collar which, upon the pressing against it of the other housing, for instance in the case of a bolting together, presses in a sealing manner into the end surface thereof.

In accordance with one embodiment of the present invention, for the additional sealing, the end surfaces which lie one in front of the other are sealed against each other by interposed circumferential packings in such a manner that the electric connecting lines are passed radially within the surrounding packing through the end surfaces, located one in front of the other, of the motor housing and/or pump housing and/or electronic housing.

BRIEF DESCRIPTION OF THE DRAWINGS

The present invention as well as further advantageous embodiments of the invention in accordance with additional features thereof are explained in further detail below with reference to the attached drawings.

DETAILED DESCRIPTION

Figure 1:
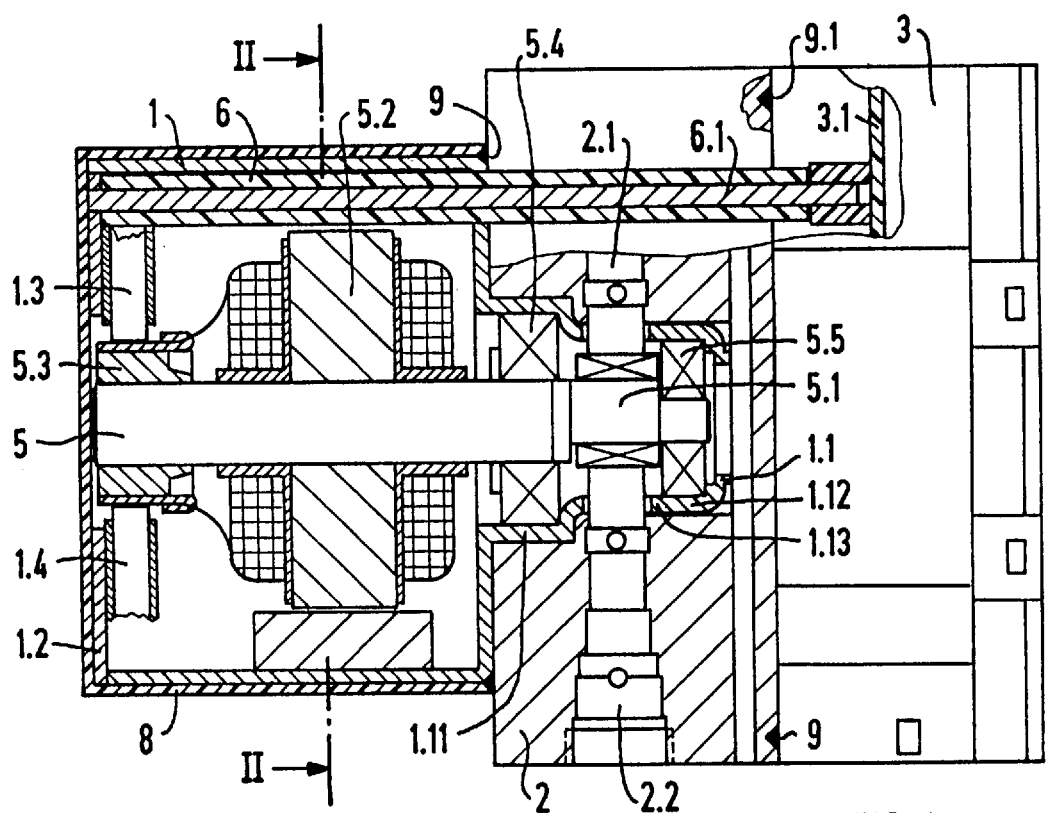
FIG. 1 illustrates an axial longitudinal section through a motor-pump unit for a motor-vehicle anti-lock brake device with a motor housing and/or pump housing and/or electronic housing arranged axially behind one another.
Figure 2:
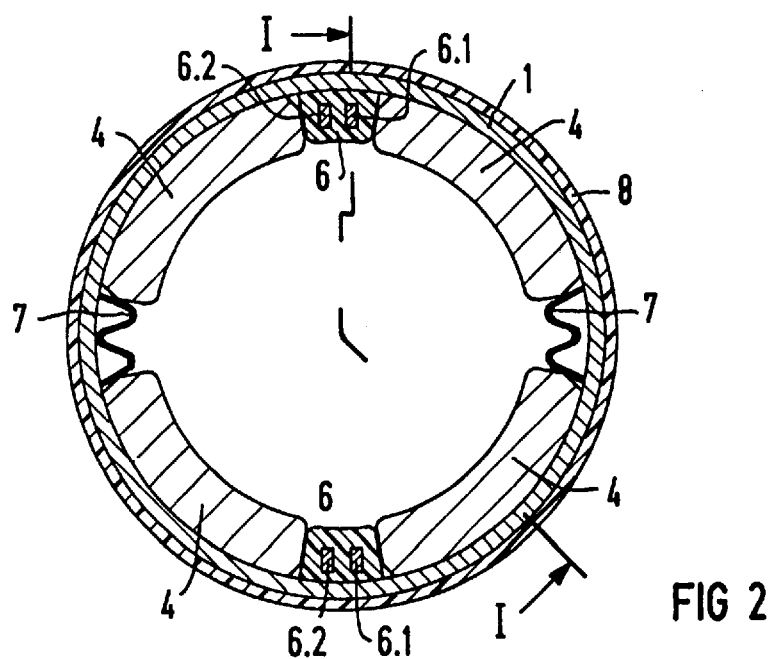
FIG. 2 illustrates the motor housing of FIG. 1 in a section along the line II—II of FIG. 1.

FIG. 1 illustrates a commutator motor having a pot-shaped motor housing 1 included in a motor-pump unit for a motor vehicle anti-lock brake device. An axially protruding bearing neck 1.1 is formed in the bottom of the pot of the motor housing 1. Magnetic shells 4 illustrated in FIG. 2 are provided on the inner circumference of the motor housing 1 for energizing the rotor winding, which is introduced in a rotor package 5.2. In relation to FIG. 1, FIG. 2 illustrates a cross-section of the motor housing 1 along the line II—II of FIG. 1, and in relation to FIG. 2, FIG. 1 shows a cut-away view of the motor-pump unit delimited by the angle I—I of FIG. 2. The rotor winding is connected to a commutator 5.3 which is fastened to a rotor shaft 5 in the region of the pot edge side of the motor housing 1. The rotor winding receives current via brushes 1.3 and 1.4, which are held or guided in a brush plate 1.2 on the motor-housing side. A pump housing 2 is flanged in sealing fashion on the bottom of the pot of the pot-shaped motor-housing 1 and is arranged axially in front of it, with ends of the motor housing 1 and pump housing 2 resting against each other. Pump rams are arranged in pump housing 2 as pump drive parts 2.1 and 2.2 of a high-pressure pump for a brake hydraulic fluid. The pump rains 2.1 and 2.2 are driven by an eccentric 5.1 on the rotor shaft 5.

The bearing neck 1.1 of the motor housing 1 extends axially into the pump housing 2 which is flanged onto the pot bottom of the motor housing 1 in such a manner that the entire mounting of the rotor shaft 5 as well as of the eccentric 5.1 extend into the pump housing 2, thus shortening the axial structural length of the entire unit. The bearing neck 1.1 includes in this connection a first section 1.11 which receives a first ball bearing 5.4, a second section 1.12 of smaller radial extent for another ball bearing 5.5 for the rotor shaft 5, and, between the first section 1.11 and second section 1.12, a third section 1.13 provided with openings for the pump rams 2.1 and 2.2.

A plastic cap 8 is advantageously provided for sealing the open end of the motor housing 1 to provide a housing which is simple to manufacture and assemble. The plastic cap 8 is placed axially from the open end onto the motor housing 1. The open end on the pot edge side of the plastic cap 8 is sealed from the adjoining pump housing 2 by a packing 9 which extends around the edge side and at the same time also seals the pot-bottom side of the motor housing 1 off from the pump housing 2. A similar circumferential sealing is provided by means of another circumferential packing 9.1 between the end sides of pump housing 2 and pump housing 3, which ends are located in front of one another.

Connecting lines 6.1 and 6.2 are provided for the electrical connection between the motor housing 1 and the electronic housing 3. In accordance with the present invention the connecting lines 6.1 and 6.2 are used as electric supply and/or control lines which extend solely within the motor housing 1, the pump housing 2, and the electronic housing 3. For this purpose the connecting lines 6.1 and 6.2 pass through the ends which lie in front of one another of the motor housing 1 and pump housing 2, and/or of the pump housing 2 and electronic housing 3. The lead-throughs through the end surfaces which lie in front of one another lie radially within the circumferential packings 9 and 9.1 in such a manner that the lead-throughs are thus definitely protected against the penetration of external moisture in the region of the end surfaces which are located one in front of the other.

The electric connecting lines 6.1 and 6.2 within the motor housing 1 are 10 arranged within axial spacers 6 in a manner which is particularly favorable from a standpoint of manufacture and assembly. In particular, the connecting lines 6.1 and 6.2 may preferably be spaced within axial spacers 6. The spacers 6 are fixed between tangentially opposite end sides of magnetic shells 4 held on the inner circumference of the motor housing 1. Clamping springs 7 may also be fixed between tangentially opposite end sides of magnetic shells 4 held on the inner circumference of the motor housing 1, as illustrated in FIG. 2.

By way of further simplification of the assembly, in accordance with one embodiment of the present invention, the spacers 6 which receive the connecting lines 6.1 and 6.2 are extended or developed in the manner of a plug connection which extends through the pump housing 2 and can be contacted in the electronic housing 3 by an electric or electronic supply or control device. In a commutator motor provided for the drive which has a brush plate 1.2 holding the brushes 1.3 and 1.4, and an electronic housing 3 with a circuit board 3.1 arranged therein which receives the parts and connections of the electrical and/or electronic supply and/or control device, the connecting lines 6.1 and 6.2 are developed as direct connections between the brush plate 1.2 in the motor housing 1 and the circuit board 3.1 in the electronic housing 3, which connections can be automatically contacted upon axial assembly.

What is claimed is:

1. A motor-pump unit, comprising:
   a pump housing including a first end surface and a second end surface;
   a motor housing including an end surface located in front of the first end surface of the pump housing;
   an electronic housing including an end surface located in front of the second end surface of the pump housing; and
   electrical connecting lines extending through the end surfaces of the pump housing, motor housing and electronic housing and extending through the pump housing between an inside of the motor housing and an inside of the electronic housing.

2. A motor-pump unit according to claim 1, wherein said motor-pump unit is included in a motor vehicle anti-lock brake device.

3. A motor-pump unit according to claim 1, wherein said electrical connecting lines include at least one of electric supply lines and control lines.

4. A motor-pump unit according to claim 1, wherein said electrical connecting lines include electric supply lines and control lines.

5. A motor-pump unit according to claim 1, wherein the end surfaces of the pump housing, motor housing and electronic housing which lie in front of each other are sealed-off from each other radially towards an outside direction by interposed circumferential packings; and wherein the electrical connecting lines extend radially within the interposed circumferential packings through the end surfaces located in front of each other of the motor housing and the pump housing as well as of the pump housing and the electronic housing.

6. A motor-pump unit according to claim 1, wherein the electrical connecting lines are provided in axial spacers within the motor housing, the spacers being fixed between tangentially opposite end sides of magnetic shells held on an inner circumference of the motor housing.

7. A motor-pump unit according to claim 6, wherein the electrical connecting lines are spaced in the axial spacers.

8. A motor-pump unit according to claim 6, wherein the spacers which receive the connecting lines include a plug connection which extends through the pump housing and can be contacted in the electronic housing by an electrical or electronic supply device.

9. A motor-pump unit according to claim 5, wherein the electrical connecting lines are provided in axial spacers within the motor housing, the spacers being fixed between tangentially opposite end sides of magnetic shells held on an inner circumference of the motor housing.

10. A motor-pump unit according to claim 9, wherein the electrical connecting lines are spaced in the axial spacers.

11. A motor-pump unit according to claim 9, wherein the spacers which receive the connecting lines include a plug connection which extends through the pump housing and can be contacted in the electronic housing by an electrical or electronic supply device.

12. A motor-pump unit according to claim 1, wherein the electrical connecting lines connect a brush plate in the motor housing to a circuit board in the electronic housing.

13. A motor-pump unit according to claim 5, wherein the electrical connecting lines connect a brush plate in the motor housing to a circuit board in the electronic housing.

14. A motor-pump unit according to claim 6, wherein the electrical connecting lines connect a brush plate in the motor housing to a circuit board in the electronic housing.

15. A motor-pump unit according to claim 7, wherein the electrical connecting lines connect a brush plate in the motor housing to a circuit board in the electronic housing.

16. A motor-pump unit according to claim 8, wherein the electrical connecting lines connect a brush plate in the motor housing to a circuit board in the electronic housing.

17. A motor-pump unit according to claim 5, wherein said motor-pump unit is included in a motor vehicle anti-lock brake device.

18. A motor-pump unit according to claim 6, wherein said motor-pump unit is included in a motor vehicle anti-lock brake device.

19. A motor-pump unit according to claim 8, wherein said motor-pump unit is included in a motor vehicle anti-lock brake device.

20. A motor-pump unit according to claim 12, wherein said motor-pump unit is included in a motor vehicle anti-lock brake device.

21. A motor-pump unit included in a motor vehicle anti-lock device, comprising:
- a pump housing including a first end surface and a second end surface;
- a motor housing including an end surface located in front of the first end surface of the pump housing;
- an electronic housing including an end surface located in front of the second end surface of the pump housing; and
- electrical connecting lines including at least one of electric supply lines and control lines extending through the end surfaces of the pump housing, motor housing and electronic housing and extending through the pump housing between an inside of the motor housing and an inside of the electronic housing;
  - wherein the end surfaces of the pump housing, motor housing and electronic housing which lie one in front of the other are sealed-off from each other radially towards an outside direction by interposed circumferential packings;
  - wherein the electrical connecting lines extend radially within the circumferential packings through the end surfaces located one in front of the other of the motor housing and the pump housing as well as of the pump housing and the electronic housing;
  - wherein the electrical connecting lines are provided in axial spacers within the motor housing, the spacers being fixed between tangentially opposite end sides of magnetic shells held on an inner circumference of the motor housing;
  - wherein the spacers which receive the connecting lines are extended or developed in a plug connection manner which extends through the pump housing and can be contacted in the electronic housing by an electrical or electronic supply device; and
  - wherein the electrical connecting lines connect a brush plate in the motor housing to a circuit board in the electronic housing.

* * * * *